(12) United States Patent
Nagai

(10) Patent No.: US 6,463,260 B1
(45) Date of Patent: Oct. 8, 2002

(54) DATA DELIVERY IN SATELLITE COMMUNICATION SYSTEM

(75) Inventor: Kazuyoshi Nagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/397,201

(22) Filed: Sep. 16, 1999

(30) Foreign Application Priority Data

Sep. 29, 1998 (JP) .......................................... 10-275898

(51) Int. Cl.$^7$ ............................................. H04B 7/185
(52) U.S. Cl. ..................... 455/12.1; 455/427; 455/13.1; 455/430; 747/748
(58) Field of Search .............................. 455/12.1, 13.1, 455/13.3, 3.2, 427, 428, 430, 13.2, 500; 370/316, 325; 714/18, 747, 748, 749

(56) References Cited

U.S. PATENT DOCUMENTS

| | | | | |
|---|---|---|---|---|
| 5,640,673 A | * | 6/1997 | Tanabe | 455/12.1 |
| 5,838,668 A | * | 11/1998 | Okada et al. | 455/12.1 |
| 5,918,156 A | * | 6/1999 | Tanabe | 455/12.1 |
| 6,023,605 A | * | 2/2000 | Sasaki et al. | 455/12.1 |
| 6,088,571 A | * | 7/2000 | Kane et al. | 455/12.1 |
| 6,256,496 B1 | * | 7/2001 | Dintelmann et al. | 455/12.1 |

FOREIGN PATENT DOCUMENTS

| | | |
|---|---|---|
| JP | 3-243038 | 10/1991 |
| JP | 5-167565 | 7/1993 |
| JP | 7-202779 | 8/1995 |
| JP | 7-202781 | 8/1995 |

* cited by examiner

*Primary Examiner*—Nay Maung
*Assistant Examiner*—Sonny Trinh
(74) *Attorney, Agent, or Firm*—Katten Muchin Zavis Roseman

(57) ABSTRACT

A method of delivering data from a transmission station to receiver stations via satellite communication links includes the steps of delivering delivery data from the transmission station to the receiver stations via the satellite communication links, checking if the delivery data is successfully received at each of the receiver stations, sending results of the check from the receiver stations to the transmission station, generating control data from the results of the check at the transmission station, the control data indicating which receiver station failed to receive the delivery data and which receiver station succeeded in receiving the delivery data, sending the control data from the transmission station to the receiver stations, and transferring the delivery data in response to the control data from a first one of the receiver stations having succeeded in receiving the delivery data to a second one of the receiver stations having failed to receive the delivery data.

19 Claims, 15 Drawing Sheets

FIG. 2

TALLIED RECEPTION-STATUS DATA

| RECEPTION STATUS | EARTH RECEIVER STATION 24-1 | EARTH RECEIVER STATION 24-2 | ----- | EARTH RECEIVER STATION 24-n-1 | EARTH RECEIVER STATION 24-n |
|---|---|---|---|---|---|
| (A) | 0 | 1 | ----- | 1 | 1 |
| (B) | 1 | 0 | ----- | 1 | 1 |
| (C) | 1 | 1 | ----- | 0 | 1 |
| . | . | . | ----- | . | . |
| (Z) | 1 | 1 | ----- | 1 | 0 |

NOTE) "1" : SUCCESSFUL RECEIPT
"0" : FAILED RECEIPT

FIG. 8

| TRANSFER INSTRUCTION | EARTH RECEIVER STATION 24-1 | | EARTH RECEIVER STATION 24-2 | | EARTH RECEIVER STATION 24-n-1 | | EARTH RECEIVER STATION 24-n | |
|---|---|---|---|---|---|---|---|---|
| | RECEPTION STATUS | TRANSFER-REQUEST DESTINATION | RECEPTION STATUS | TRANSFER-REQUEST DESTINATION | RECEPTION STATUS | TRANSFER-REQUEST DESTINATION | RECEPTION STATUS | TRANSFER-REQUEST DESTINATION |
| (A) | 0 | n+1 | 1 | 0 | 1 | 0 | 1 | 0 |
| (B) | 1 | 0 | 0 | n | 1 | 0 | 1 | 0 |
| (C) | 1 | 0 | 1 | 0 | 0 | 1 | 1 | 0 |
| . | . | . | . | . | . | . | . | . |
| (Z) | 1 | 0 | 1 | 0 | 1 | 0 | 0 | 2 |

NOTE) "1": SUCCESSFUL RECEIPT
"0": FAILED RECEIPT

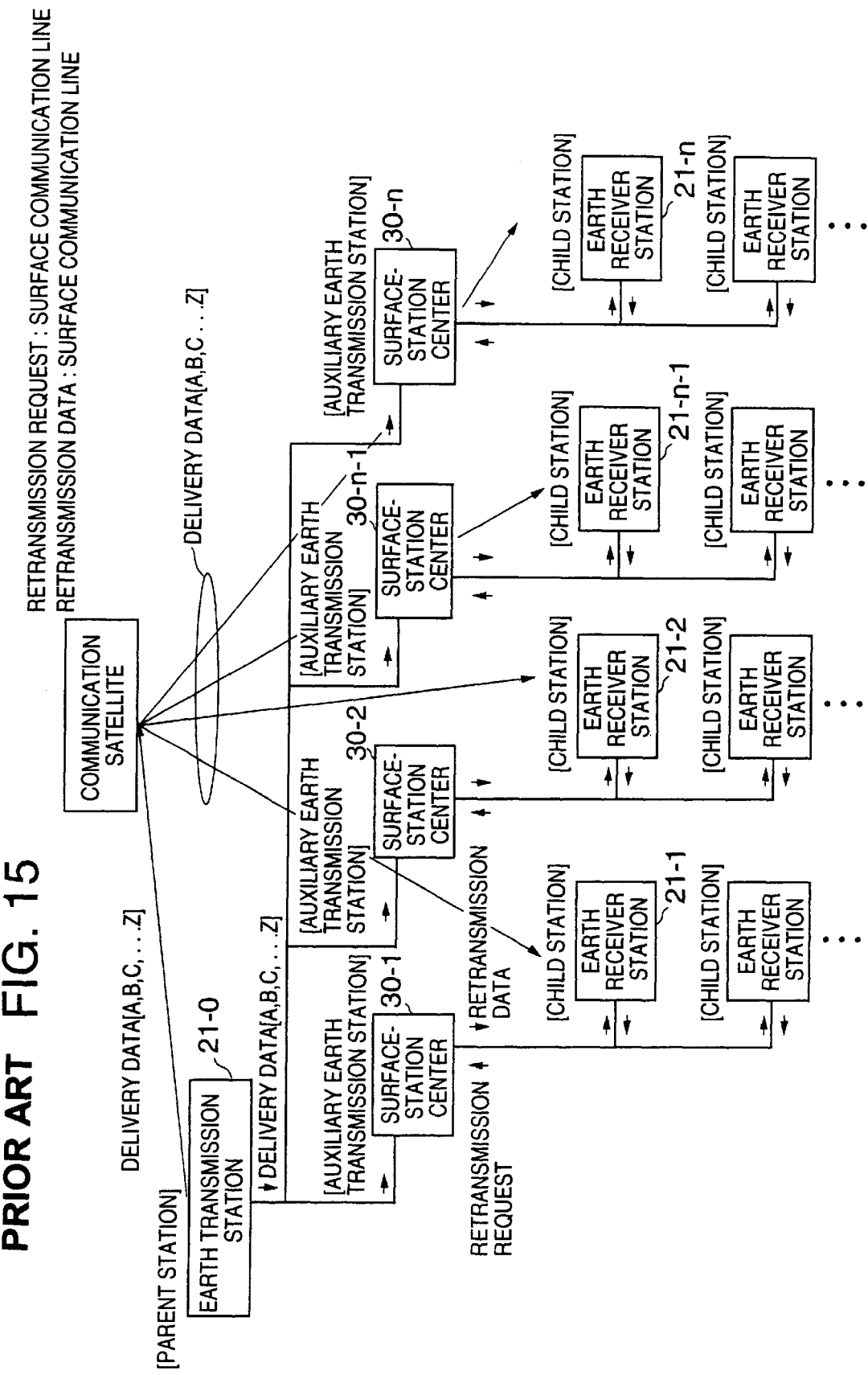
PRIOR ART FIG. 15

DATA DELIVERY IN SATELLITE COMMUNICATION SYSTEM

BACKGROUND OF THE INVENTION

1. Field of the Invention

The present invention generally relates to a method of transferring data and an earth station used in satellite communication.

Satellite communication systems are widely used by corporations, government agencies, etc. Use of such systems is not limited to use as a backup system, but includes delivery of information from a base station to a large number of stations when the information is of such a broadcast nature. In particular, such systems are used for simultaneous delivery of identical data to a large number of different locations.

2. Description of the Related Art

FIG. 13 is an illustrative drawing showing a configuration of a satellite communication system in which data is first delivered via a satellite network, and is resent via a surface communication line. Namely, both satellite communication and surface communication are used.

The communication system of FIG. 13 includes a surface-station center 30-0, an earth transmission station 21-0, and earth receiver stations 21-1–21-n. The surface-station center 30-0 generates data to be delivered. The earth transmission station 21-0 transmits the delivery data via the satellite communication link. The earth receiver stations 21-1–21-n receive the delivery data via satellite communication links.

Operations of the communication system will be described below.

The surface-station center 30-0 sends delivery data to the earth transmission station 21-0 via a surface communication line. The earth transmission station 21-0 delivers the data simultaneously to the earth receiver stations 21-1–21-n through satellite communication links (i.e., through an uplink, a satellite, and downlinks). Each of the earth receiver stations 21-1–21-n receives the delivered data.

If one of the earth receiver stations receives the delivery data with some errors, this receiver station sends a request to the surface-station center 30-0 via a surface communication line to have the delivery data transmitted again. In response, the surface-station center 30-0 resend the delivery data to this earth receiver station via the surface communication line. Depending on circumstances surrounding the retransmission requests, the surface-station center 30-0 may use the earth transmission station 21-0 to resend the data via the satellite communication links. This scheme is disclosed in Japanese Patent Laid-open Application No. 5-167565.

FIG. 14 is an illustrative drawing showing another configuration of a satellite communication system in which data is first delivered via a satellite network, and is resent via a surface communication line.

In this satellite communication system, an auxiliary earth transmission station is provided in order to attend to some of what the surface-station center 30-0 does in the configuration of FIG. 13. One of the earth receiver stations 21-1–21-n (i.e., the earth receiver station 21-1 in the example of FIG. 14) is assigned as the auxiliary earth transmission station. The earth receiver station 21-1 accumulates all the received delivery data, and sends a relevant portion of the data to another earth receiver station via a surface communication line when this receiver station requests retransmission of delivery data.

In this manner, if one of the earth receiver stations receives the delivery data with some errors, this receiver station sends a request to the auxiliary earth transmission station 21-1 via the surface communication line to have the delivery data transmitted again. This scheme is disclosed in Japanese Patent Laid-open Application No. 7-202779.

FIG. 15 is an illustrative drawing showing a configuration of a satellite communication system in which data delivered via a satellite network is resent via surface communication lines from a plurality of auxiliary earth transmission stations.

In the satellite communication system of FIG. 15, auxiliary earth transmission stations 30-1–30-n serving the same purposes as the auxiliary earth transmission station 21-1 of FIG. 14 are provided. Each of the auxiliary earth transmission stations 30-1–30-n is connected and dedicated to a separate set of the earth receiver stations 21-1–21-n. Further, the auxiliary earth transmission stations 30-1–30-n are connected to the earth transmission station 21-0 via a surface communication line.

Each of the auxiliary earth transmission stations 30-1–30-n accumulates delivered data that is received from earth transmission station 21-0 not only through the communication satellite but also through the surface communication line. In response to a retransmission request from an earth receiver station, a corresponding auxiliary earth transmission station resends the delivery data to the requesting station via a surface communication line.

In this manner, if one of the earth receiver stations receives the delivery data with some errors, this receiver station sends a request to a corresponding auxiliary earth transmission station via the surface communication line to have the delivery data transmitted again. This scheme is disclosed in Japanese Patent Laid-open Application No. 7-202781.

In the data transfer of the related-art satellite communication systems, an uplink between the earth transmission station 21-0 and the communication satellite may suffer a degradation in communication link quality (i.e., a decrease in carrier-to-noise power ratio) owing to signal attenuation caused by rains or the like. Such a degradation may result in bit errors occurring in the delivery data, and may cause earth receiver stations to receive erroneous delivery data. It is in such a situation when retransmission of data needs to be requested.

If a large number of earth receiver stations fail to receive correct data, all of these receiver stations issue a request for retransmission of delivery data to the transmission station (i.e., the surface-station center 30-0, the auxiliary earth transmission station 21-1, or the auxiliary earth transmission stations 30-1–30-n). As a result, the load of retransmission requests is concentrated on the transmission station. If a surface communication line connected to the transmission station is out of operation because of a natural disaster, a transit-device failure etc., the delivery data can not be retransmitted and corrected in the large number of earth receiver stations.

Accordingly, there is a need for a method of data transfer which can prevent data-transfer requests from concentrating on a single station when a large number of earth receiver stations try to have the failed-delivery data resend for correction purposes.

SUMMARY OF THE INVENTION

Accordingly, it is a general object of the present invention to provide a method of data transfer which can satisfy the need described above.

It is another and more specific object of the present invention to provide a method of data transfer which can prevent data-transfer requests from concentrating on a single station when a large number of earth receiver stations try to have the failed-delivery data resend for correction purposes.

In order to achieve the needs described above according to the present invention, a method of delivering data from a transmission station to receiver stations via satellite communication links includes the steps of delivering delivery data from the transmission station to the receiver stations via the satellite communication links, checking if the delivery data is successfully received at each of the receiver stations, sending results of the check from the receiver stations to the transmission station, generating control data from the results of the check at the transmission station, the control data indicating which receiver station failed to receive the delivery data and which receiver station succeeded in receiving the delivery data, sending the control data from the transmission station to the receiver stations, and transferring the delivery data in response to the control data from a first one of the receiver stations having succeeded in receiving the delivery data to a second one of the receiver stations having failed to receive the delivery data.

In the method described above, the second one of the receiver stations may send a transfer request to the first one of the receiver stations in response to the control data, thereby having the first one of the receiver stations transfer the delivery data to the second one of the receiver stations. Alternatively, the first one of the receiver stations may initiate the transfer of delivery data in response to the control data without receiving a transfer request. In this manner, data transfer between the receiver stations is carried out in order to recover missing delivery data. This configuration avoids a situation where a large number of transfer requests made by receiver stations concentrate on the single transmission station.

Further, the delivery data are transferred between the receiver stations via a satellite communication link or a surface communication line. This insures successful data recovery even if a surface communication line of the transmission station suffers a connection failure.

Other objects and further features of the present invention will be apparent from the following detailed description when read in conjunction with the accompanying drawings.

BRIEF DESCRIPTION OF THE DRAWINGS

FIG. 2 is a table showing an example of tallied reception-status data;

FIG. 8 is a table showing an example of transfer-request-destination-identification data for indicating a destination to which a transfer request should be sent;

FIG. 15 is an illustrative drawing showing a yet another configuration of a related-art satellite communication system.

DESCRIPTION OF THE PREFERRED EMBODIMENTS

In the following, embodiments of the present invention will be described with reference to the accompanying drawings.

Figure 1:
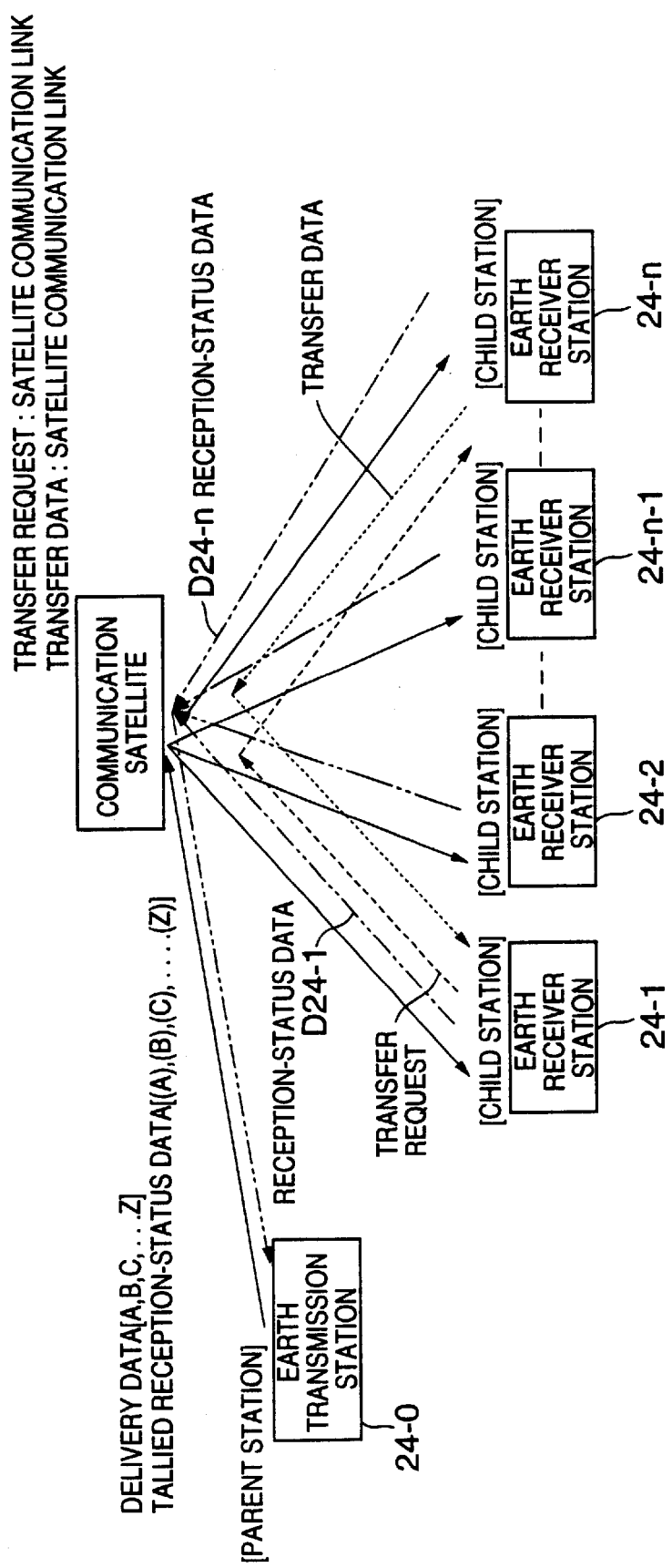
FIG. 1 is an illustrative drawing showing a configuration of a satellite communication system according to a first embodiment of the present invention.

FIG. 1 is an illustrative drawing showing a configuration of a satellite communication system according to a first embodiment of the present invention, in which data delivered via satellite links is resent from an earth receiver station to another earth receiver station via a satellite link for the correction purposes.

A satellite-communication system of FIG. 1 includes an earth transmission station 24-0 and a plurality of earth receiver stations 24-1–24-n. The earth transmission station 24-0 delivers (multicasts) data via satellite communication links, and the earth receiver stations 24-1–24-n receive the delivered data.

The earth transmission station 24-0 is equipped with transmission/reception functions, and transmits delivery data simultaneously to the earth receiver stations 24-1–24-n via satellite communication links. The delivery data is comprised of a plurality of data segments A, B, C, . . . , and Z. Further, the earth transmission station 24-0 receives reception-status data D24-1–D24-n from the earth receiver stations 24-1–24-n, respectively. The reception-status data D24-1–D24-n indicate a status of data receipt with respect to earth receiver stations 24-1–24-n, respectively, on a data-segment-wise basis. That is, the reception-status data D24-1–D24-n show whether the respective earth receiver stations 24-1–24-n successively received correct data segments A, B, C, . . . , and Z with regard to each of these data segments.

Further, the earth transmission station 24-0 organizes the reception-status data D24-1–D24-n so as to create tallied reception-status data (A), (B), (C), . . . , and (Z). Tallied reception-status data (A), (B), (C), . . . , and (Z) shows a status of data receipt with respect to each of the data segments A, B, C, . . . , and D for each of the earth receiver stations 24-1–24-n. The tallied reception-status data (A), (B), (C), . . . , and (Z) is then delivered to the earth receiver stations 24-1–24-n via the satellite communication links.

FIG. 2 is a table showing an example of the tallied reception-status data.

The tallied reception-status data (A), (B), (C), . . . , and (Z) indicates whether a given data segment of the delivery data is successfully received by a given earth receiver station. As shown in FIG. 2, the table has rows thereof corresponding to the data segments A, B, C, . . . , and Z, and has columns thereof corresponding to the earth receiver stations 24-1–24-n, with an entry "1"indicating successful receipt and an entry "0" indicating failed receipt.

Each of the earth receiver stations 24-1–24-n is provided with transmission/reception functions. The earth receiver stations 24-1–24-n check whether each of the data segments A, B, C, . . . , and Z is successively received, and generate the reception-status data D24-1–D24-n, respectively, based on the checks. The reception-status data D24-1–D24-n are sent to the earth transmission station 24-0 via the satellite communication links.

Each of the earth receiver stations 24-1–24-n then receives the tallied reception-status data (A), (B), (C), . . . , and (Z) via the satellite communication links when the tallied reception-status data (A), (B), (C), . . . , and (Z) is generated and transmitted by the earth transmission station 24-0. A given one of the earth receiver stations 24-1–24-n may have a data segment that was not successfully received. In such a case, this earth receiver station searches for other earth receiver stations that have succeeded in receiving this particular data segment based on the tallied reception-status data (A), (B), (C), . . . , and (Z). Then, one station is selected from the earth receiver stations found in the search, and a transfer request is sent to the selected station via the satellite communication link so as to ask for transfer of the data segment.

The earth receiver stations 24-1–24-n keep the delivery data which they successfully received. When receiving a transfer request from another earth receiver station, a given earth receiver station transfers requested data through a satellite communication link to the station which requested the transfer of data. The station receiving the transferred data corrects the failed delivery data with the transferred data.

Operations of the first-embodiment configuration will be described with reference to FIG. 1.

In a method of data transfer according to the first embodiment, an earth receiver station that has failed to receive correct delivery data sends a transfer request to another earth receiver station that has successfully received the correct delivery data. Then, the latter earth receiver station transfers the data to the former earth receiver station, so that the former earth receiver station can obtain the missing delivery data.

In detail, the earth transmission station 240 sends delivery data to the earth receiver stations 24-1–24-n via satellite communication links. Each of the earth receiver stations 24-1–24-n receives the delivery data, and checks a receipt status of each data segment (A, B, C, . . . , and Z). Data segments that were successfully received are kept in storage. Based on the checks, the earth receiver stations 24-1–24-n generate the reception-status data D24-1–D24-n, respectively. The reception-status data D24-1–D24-n are then sent to the earth transmission station 24-0 via the satellite communication links.

The earth transmission station 24-0 puts together the reception-status data D24-1–D24-n to generate the tallied reception-status data (A), (B), (C), . . . , and (Z). The earth transmission station 24-0 delivers the tallied reception-status data (A), (B), (C), . . . , and (Z) to the earth receiver stations 24-1–24-n via the satellite communication links.

An earth receiver station that has failed to receive a particular data segment searches for other earth receiver stations that have succeeded in receiving this particular data segment based on the tallied reception-status data (A), (B), (C), . . . , and (Z), and, then, selects one station from the earth receiver stations found in the search. A transfer request is generated and sent to the selected station via a satellite communication link. In response to the transfer request, the selected earth receiver station transfers requested data through the satellite communication link to the station which requested the transfer of data. The station receiving the transferred data corrects the failed delivery data with the transferred data.

Figure 3:
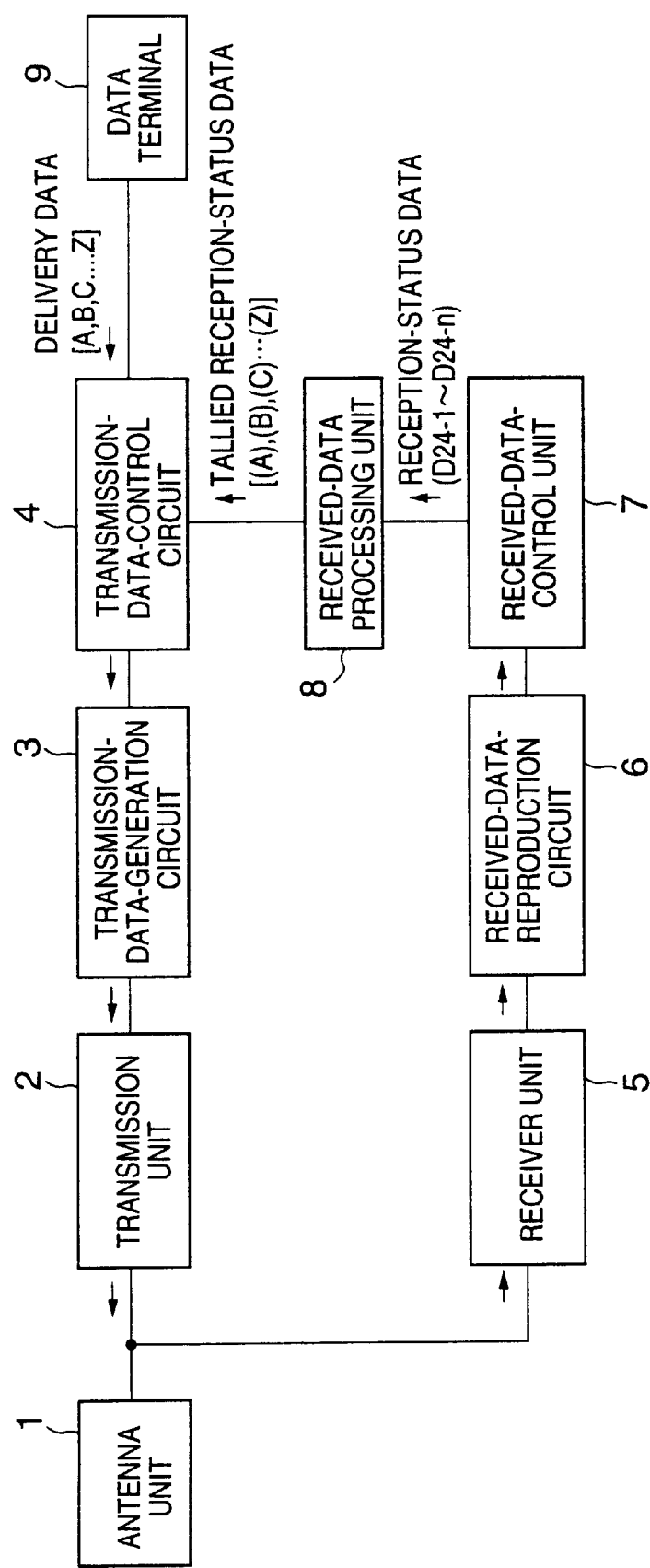
FIG. 3 is a block diagram showing a functional configuration of an earth transmission station according to the first embodiment of the present invention.

FIG. 3 is a block diagram showing a functional configuration of the earth transmission station according to the first embodiment of the present invention.

The earth transmission station of FIG. 3 includes an antenna unit 1, a transmission unit 2, a transmission-data-generation circuit 3, a transmission-data-control circuit 4, a receiver unit 5, a received-data-reproduction circuit 6, a received-data-control unit 7, a received-data processing unit 8, and a data terminal 9.

The data terminal 9 generates delivery data. The transmission-data-control circuit 4 generates transmission data from the delivery data or from tallied reception-status data (A), (B), (C), . . . , and (Z). The transmission-data-generation circuit 3 generates transmission signals by organizing the transmission data into frames or the like. The transmission unit 2 applies frequency transformation and power amplification to the transmission signals. The antenna unit 1 transmits and receives radio signals via satellite communication links. The receiver unit 5 attends to inverse frequency transformation and demodulation. The received-data-reproduction circuit 6 obtains received data from the frames of the received signals. The received-data-control unit 7 extracts reception-status data D24-1–D24-n from the received data. The received-data processing unit 8 generates the tallied reception-status data (A), (B), (C), . . . , and (Z) from the reception-status data D24-1–D24-n. As previously described, the reception-status data D24-1–D24-n are received from the respective earth receiver stations 24-1–24-n through satellite communication links, and the tallied reception-status data (A), (B), (C), . . . , and (Z) is generated by putting together and organizing the reception-status data D24-1–D24-n.

Operations of the earth transmission station according to the first embodiment will be described with reference to FIG. 3.

The earth transmission station does not attend to retransmission of delivery data to the earth receiver stations that have failed to receive correct delivery data. Rather, the earth transmission station generates the tallied reception-status data (A), (B), (C), . . . , and (Z), and delivers this data to each of the earth receiver stations. The tallied reception-status data (A), (B), (C), . . . , and (Z) makes it possible to transfer delivery data from an earth receiver station to another earth receiver station when the latter earth receiver station failed to receive the delivery data successfully.

In detail, the data terminal 9 transmits the delivery data as transmission signals by using the transmission-data-control circuit 4, the transmission-data-generation circuit 3, the transmission unit 2, and the antenna unit 1. The receiver unit 5 receives signals from the earth receiver stations via the antenna unit 1, and supplies the received signals to the received-data-reproduction circuit 6. The received-data-reproduction circuit 6 and the received-data-control unit 7 obtain the reception-status data D24-1–D24-n from the received signals, and provide the data to the received-data processing unit 8. The received-data processing unit 8 puts together the reception-status data D24-1–D24-n to generate the tallied reception-status data (A), (B), (C), . . . , and (Z), which is supplied to the transmission-data-control circuit 4. The transmission-data-control circuit 4 transmits the tallied reception-status data (A), (B), (C), . . . , and (Z) via the transmission-data-generation circuit 3, the transmission unit 2, and the antenna unit 1.

Figure 4:
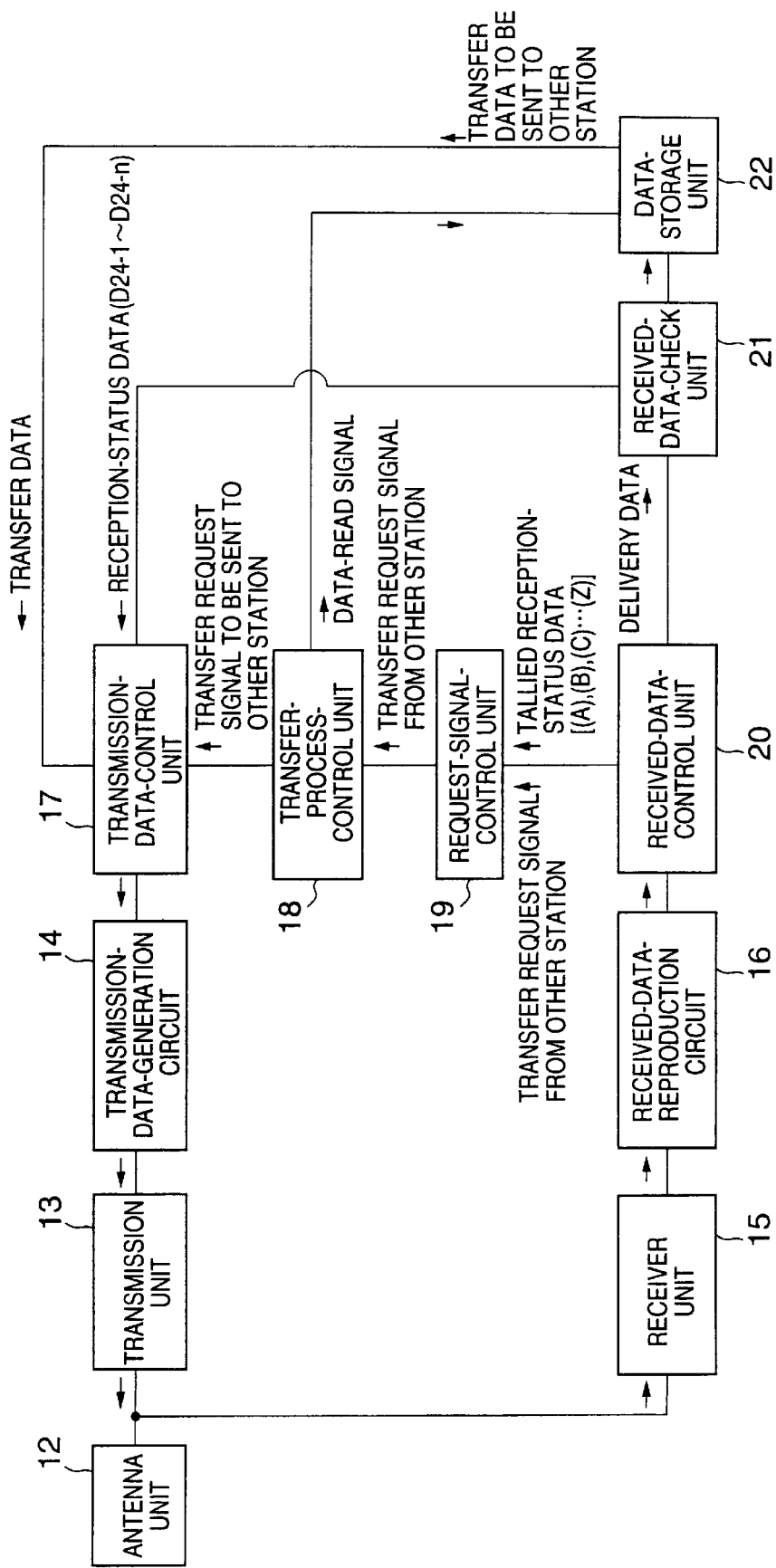
FIG. 4 is a block diagram showing a functional configuration of an earth receiver station according to the first embodiment of the present invention.

FIG. 4 is a block diagram showing a functional configuration of the earth receiver station according to the first embodiment of the present invention.

The earth receiver station of FIG. 4 includes an antenna unit 12, a transmission unit 13, a transmission-data-generation circuit 14, a receiver unit 15, a received-data-reproduction circuit 16, a transmission-data-control unit 17, a transfer-process-control unit 18, a request-signal-control unit 19, a received-data-control unit 20, a received-data-check unit 21, and a data-storage unit 22.

The antenna unit 12 transmits and receives signals. The receiver unit 15 attends to inverse frequency transformation and demodulation of the received signals. The received-data-reproduction circuit 16 obtains received data by disassembling the frames of the received signals. The received-data-control unit 20 supplies delivery data included in the received data to the received-data-check unit 21, and supplies the tallied reception-status data (A), (B), (C), . . . , and (Z) to the request-signal-control unit 19. Further, the received-data-control unit 20 passes a transfer-request signal along to the request-signal-control unit 19 when the transfer-request signal is received from another earth receiver station. The received-data-check unit 21 checks a reception status of the received delivery data. The data-storage unit 22 stores data in a storage if the data is successfully received. The request-signal-control unit 19 supplies the transfer-request signal to the transfer-process-control unit 18, and the transfer-process-control unit 18 attends to a process of reading delivery data stored in the storage. The transmission-data-control unit 17 generates transmission data, which corresponds to the station's own reception-status data, transfer data to be sent to another station, or a transfer-request signal for requesting another station to send transfer data. The transmission-data-generation circuit 14 assembles frames including the transmission data so as to generate transmission signals. The transmission unit 13 performs frequency transformation and power amplification on the transmission signals.

The received-data-check unit 21 checks whether each of the segments A, B, C, . . . , and Z of the received delivery data is successfully received, and supplies successfully received data segments to the data-storage unit 22. Based on the check results, further, the received-data-check unit 21 generates the reception-status data.

The data-storage unit 22 stores successfully received data segments. The request-signal-control unit 19 searches in the tallied reception-status data (A), (B), (C), . . . , and (Z) for earth receiver stations succeeding in receiving a particular data segment if the station of FIG. 4 fails to receive this particular data segment. The request-signal-control unit 19 further selects one of the stations found in the search, and generates a transfer-request signal for requesting the selected station to transfer the particular data segment.

In what follows, operations of the earth receiver station according to the first embodiment will be described with reference to FIG. 4.

The earth receiver station does not request the earth transmission station to resend the delivery data when failing to receive correct delivery data. Rather, the earth receiver station sends a request to another earth receiver station that successfully received the delivery data, so that delivery data is transferred from the latter station to the former station.

The receiver unit 15 receives signals from the earth transmission station via the antenna unit 12, and supplies the received signals to the received-data-reproduction circuit 16. The received-data-reproduction circuit 16 obtains delivery data (or transfer data from another earth receiver station) from the received signals, and supplies the obtained data to the received-data-check unit 21 via the received-data-control unit 20. The received-data-check unit 21 checks a reception status of the received delivered data, and has the data-storage unit 22 store the successfully received delivery data. The received-data-check unit 21 also generates reception-status data, and provides it to the transmission-data-control unit 17. The transmission-data-control unit 17 transmits the reception-status data via the transmission-data-generation circuit 14, the transmission unit 13, and the antenna unit 12.

The receiver unit 15 receives the tallied reception-status data (A), (B), (C), . . . , and (Z) from the earth transmission station. The tallied reception-status data (A), (B), (C), . . . , and (Z) is supplied to the request-signal-control unit 19. The request-signal-control unit 19 generates a transfer-request signal directed to an earth receiver station selected from the tallied reception-status data (A), (B), (C), . . . , and (Z), and supplies the transfer-request signal to the transmission-data-control unit 17 via the transfer-process-control unit 18.

On the other hand, when the receiver unit 15 receives a transfer-request signal from another earth receiver station, the transfer-request signal is supplied to the transfer-process-control unit 18. The transfer-process-control unit 18 generates and sends a read signal to the data-storage unit 22 so as to read requested data from the data-storage unit 22. In response to the read signal, the data-storage unit 22 supplies the requested data as transfer data to the transmission-data-control unit 17.

When receiving the transfer-request signal directed to another station, the transmission-data-control unit 17 transmits the transfer-request signal via the transmission-data-generation circuit 14, the transmission unit 13, and the antenna unit 12. When receiving the transfer data directed to another station, the transmission-data-control unit 17 transmits the transfer data via the transmission-data-generation circuit 14, the transmission unit 13, and the antenna unit 12.

Figure 5:
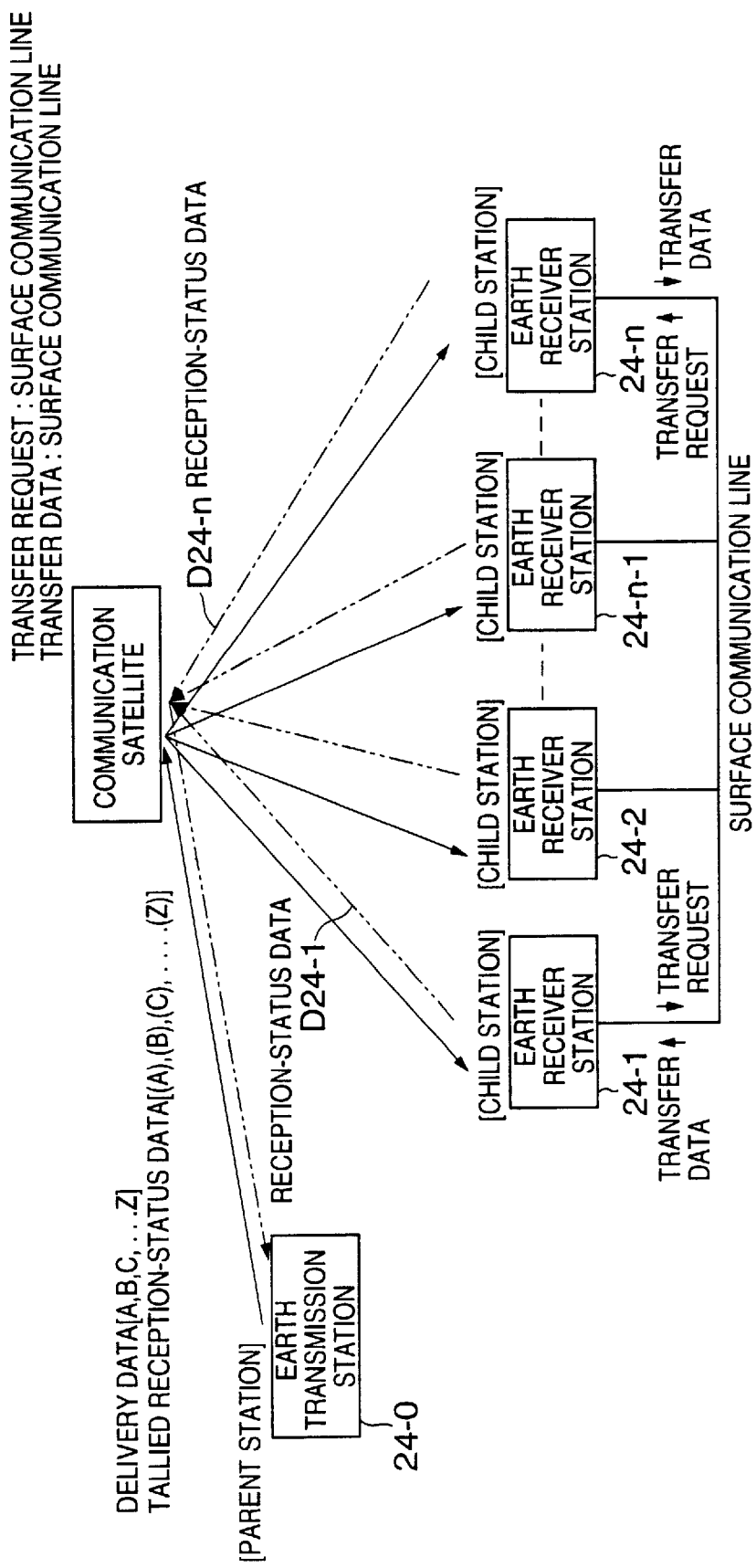
FIG. 5 is an illustrative drawing showing a configuration of a satellite communication system according to a second embodiment of the present invention.

FIG. 5 is an illustrative drawing showing a configuration of a satellite communication system according to a second embodiment of the present invention, in which data delivered via satellite links is resent from an earth receiver station to another earth receiver station through a surface communication As shown in FIG. 5, the earth receiver stations 24-1–24-n are connected together via a surface communication line.

Operations according to the second embodiment will be described with reference to FIG. 5.

In a method of data transfer according to the second embodiment, an earth receiver station that has successfully received correct delivery data sends the delivery data via a surface communication line to another earth receiver station that has failed to receive the correct delivery data.

Operations of the second embodiment are identical to those of the first embodiment up to a point where an earth receiver station failing to receive correct delivery data generates a transfer request. At a next step, the earth receiver station sends the transfer request to a selected earth receiver station via a surface communication line. In response to the transfer request, the selected earth receiver station transfers requested data through the surface communication line to the station which requested the transfer of data. The station receiving the transferred data corrects the failed delivery data with the transferred data.

Figure 6:
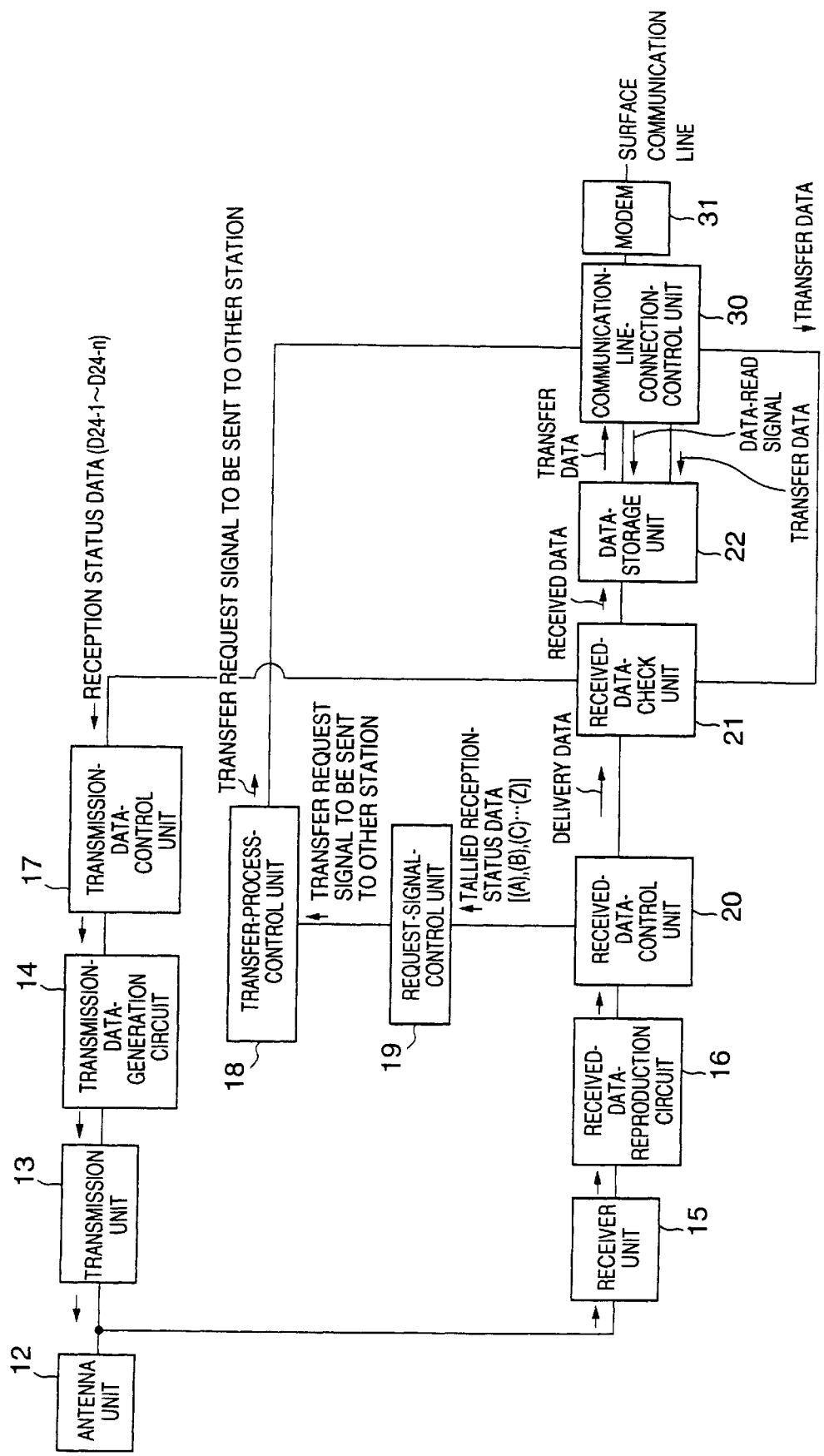
FIG. 6 is a block diagram showing a functional configuration of an earth receiver station according to the second embodiment of the present invention.

FIG. 6 is a block diagram showing a functional configuration of the earth receiver station according to the second embodiment of the present invention.

The earth receiver station of FIG. 6 includes a communication-line-connection-control unit 30 and a modem 31 in addition to the configuration shown in FIG. 4. Operations of the earth receiver station according to the second embodiment will be described with reference to FIG. 6.

When there is data which was not successfully received, the communication-line-connection-control unit 30 sends a transfer-request signal via the modem 31 to another earth receiver station that has succeeded in receiving the data. Here, the transfer-request signal is supplied to the communication-line-connection-control unit 30 from the transfer-process-control unit 18. Transfer data sent in response to the transfer request is then received at the modem 31, and is stored in the data-storage unit 22. The transfer data is also supplied to the received-data-check unit 21. The received-data-check unit 21 checks the transfer data, and has the data-storage unit 22 store the transfer data if the transfer data was received without an error.

On the other hand, when a transfer-request signal is received from another earth receiver station via the modem 31, a data read signal is generated and supplied to the data-storage unit 22 in order to read data that is requested in the transfer request. In response, the data-storage unit 22 supplies the requested data to the communication-line-connection-control unit 30 as transfer data. The communication-line-connection-control unit 30 transmits the transfer data via the modem 31 to the station that requested the transfer of data.

Figure 7:
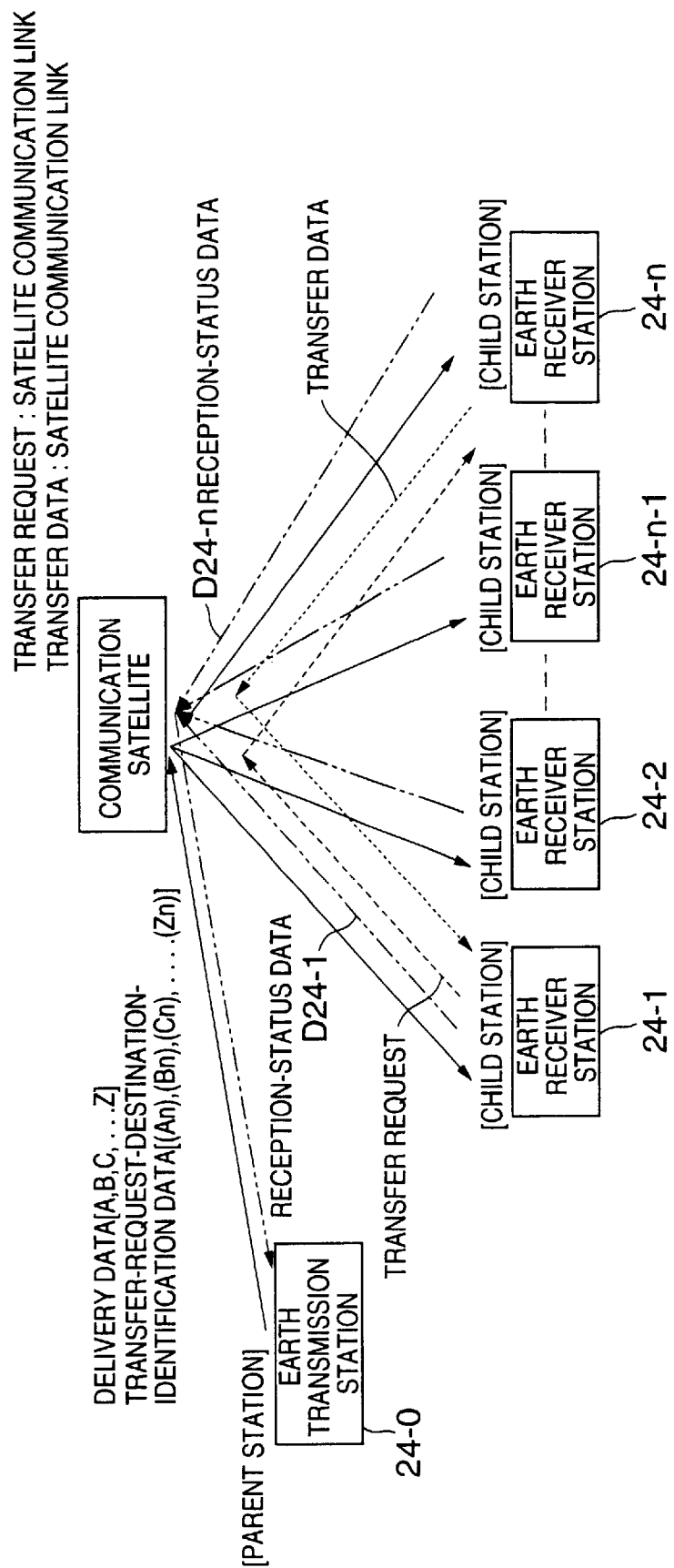
FIG. 7 is an illustrative drawing showing a configuration of a satellite communication system according to a third embodiment of the present invention.

FIG. 7 is an illustrative drawing showing a configuration of a satellite communication system according to a third embodiment of the present invention, in which data delivered via satellite links is resent from an earth receiver station to another earth receiver station via a satellite link under the control of the earth transmission station. The system configuration of the third embodiment is basically the same as that of the first embodiment.

The earth transmission station 24-0 receives the reception-status data D24-1–D24-n from the earth receiver stations 24-1–24-n, respectively, and puts together the reception-status data D24-1–D24-n. This operation is the same as that of the first embodiment. In the third embodiment, however, the earth transmission station 24-0 generates transfer-request-destination-identification data (An), (Bn), (Cn), and (Zn). The transfer-request-destination-identification data (An), (Bn), (Cn), . . . , and (Zn) informs an earth receiver station of an identity of another earth receiver station that has successfully received delivery data when the former earth receiver station failed to receive the delivery data. The transfer-request-destination-identification data (An), (Bn), (Cn), . . . , and (Zn) is supplied to the earth receiver stations 24-1–24-n via the satellite communication links.

FIG. 8 is a table showing an example of the transfer-request-destination-identification data for indicating a destination to which a transfer request should be sent.

The transfer-request-destination-identification data (An), (Bn), (Cn), . . . , and (Zn) uses an entry "1" to indicate a successful receipt of a given data segment (A, B, C, . . . , or Z) of delivery data and an entry "0" to indicate a failed receipt of a given data segment of the delivery data with respect to each of the earth receiver stations 24-1–24-n. This portion of the transfer-request-destination-identification data (An), (Bn), (Cn), . . . , and (Zn) is the same as the tallied reception-status data (A), (B), (C), . . . , and (Z). Further, the transfer-request-destination-identification data (An), (Bn), (Cn), . . . , and (Zn) identifies an earth receiver station by using a number (1, 2, 3, . . . and n) to which a transfer request should be sent in order to fetch missing data. Such identification of an earth receiver station is provided for each entry of the missing data segments. In the case of a data segment that was successfully received, an entry "0" is provided because there is no need to request a data transfer.

Each of the earth receiver stations 24-1–24-n receives the transfer-request-destination-identification data (An), (Bn), (Cn), . . . , and (Zn) from the earth transmission station 24-0 via the satellite communication links. If there is a data segment that is missing because of a data receipt failure, an earth receiver station generates and sends a transfer request to another earth receiver station that is identified in the transfer-request-destination-identification data (An), (Bn), (Cn), . . . , and (Zn).

In what follows, operations of the third embodiment configuration will be described with reference to FIG. 7.

In a method of data transfer according to the third embodiment, an earth receiver station failing to receive correct delivery data sends a transfer request to another earth receiver station, which is identified by the earth transmission station as a station having successfully received the delivery data. Then, the latter earth receiver station transfers the data to the former earth receiver station, so that the former earth receiver station can obtain the missing delivery data.

In detail, the earth transmission station 240 receives the reception-status data D24-1–D24-n from the earth receiver stations 24-1–24-n, respectively, and puts together the reception-status data D24-1–D24-n. Up to this point, operations are identical between the third embodiment and the first embodiment. At a next step, the earth transmission station 24-0 generates the transfer-request-destination-identification data (An), (Bn), (Cn), . . . , and (Zn) for indicating an earth receiver station to which a transfer request should be sent, and sends the transfer-request-destination-identification data (An), (Bn), (Cn), . . . , and (Zn) to each of the earth receiver stations 24-1–24-n via satellite communication links. An earth receiver station generates a transfer request for requesting another earth receiver station identified in the transfer-request-destination-identification data (An), (Bn), (Cn), . . . , and (Zn) to transfer missing data, and sends the transfer request to the identified earth receiver station via a satellite communication link. In response to the transfer request, the identified earth receiver station transfers requested data through the satellite communication link to the station which requested the transfer of data. The station receiving the transferred data corrects the failed delivery data with the transferred data.

Figure 9:
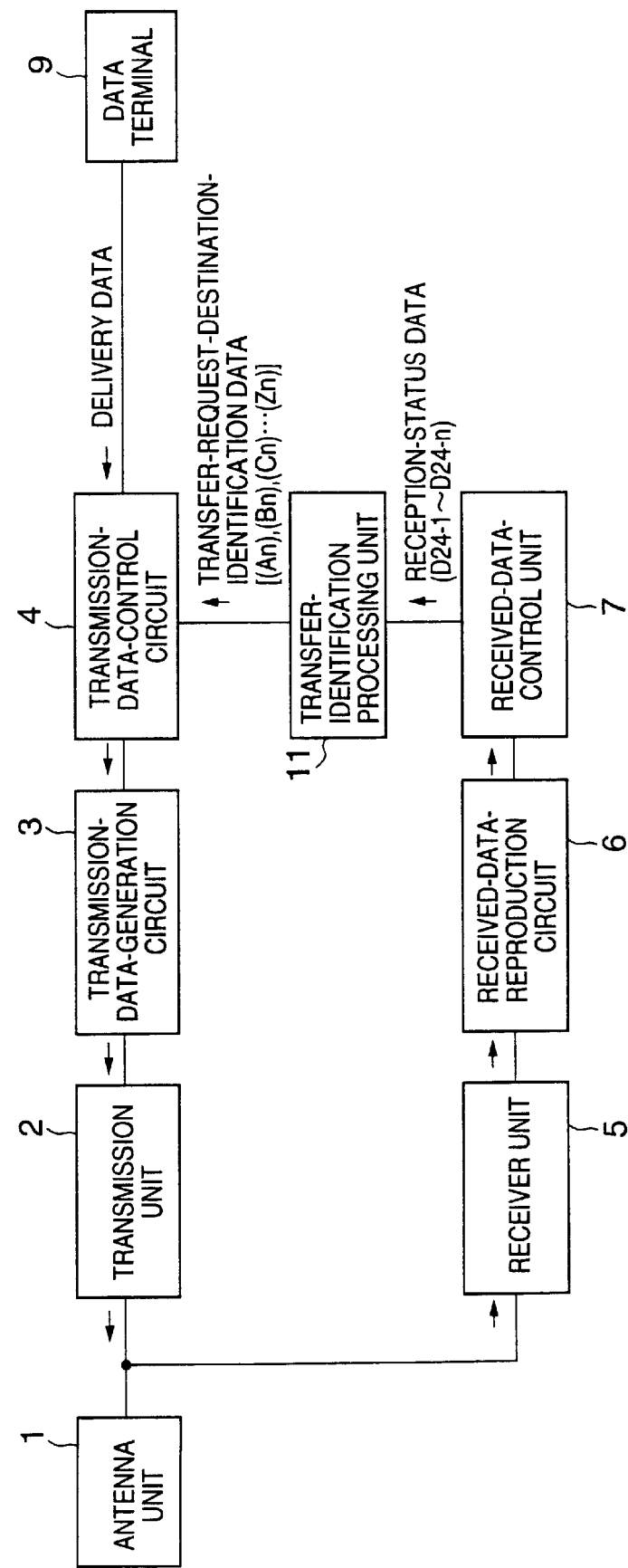
FIG. 9 is a block diagram showing a functional configuration of an earth transmission station according to the third embodiment of the present invention.

FIG. 9 is a block diagram showing a functional configuration of the earth transmission station according to the third embodiment of the present invention. The earth transmission station of FIG. 9 includes a transfer-identification processing unit 11 in place of the received-data processing unit 8 of FIG. 3 used in the first embodiment.

Operations of the earth transmission station according to the third embodiment will be described with reference to FIG. 9.

In the third embodiment, the earth transmission station gives directions to an earth receiver station that has failed to receive delivery data, such that the directions indicate which one of other earth receiver stations should be used for data transfer. In detail, the receiver unit 5 receives signals via the antenna unit 1, and the reception-status data D24-1–D24-n is obtained by the received-data-reproduction circuit 6 and the received-data-control unit 7. The reception-status data D24-1–D24-n is then supplied to the transfer-identification processing unit 11. Operations up to this point are basically identical between the third embodiment and the first embodiment. The transfer-identification processing unit 11 puts together the reception-status data D24-1–D24-n to generate the transfer-request-destination-identification data (An), (Bn), (Cn), . . . , and (Zn), which is then supplied to the transmission-data-control circuit 4. The transmission-data-control circuit 4 transmits the transfer-request-destination-identification data (An), (Bn), (Cn), . . . , and (Zn) via the transmission-data-generation circuit 3, the transmission unit 2, and the antenna unit 1.

Figure 10:
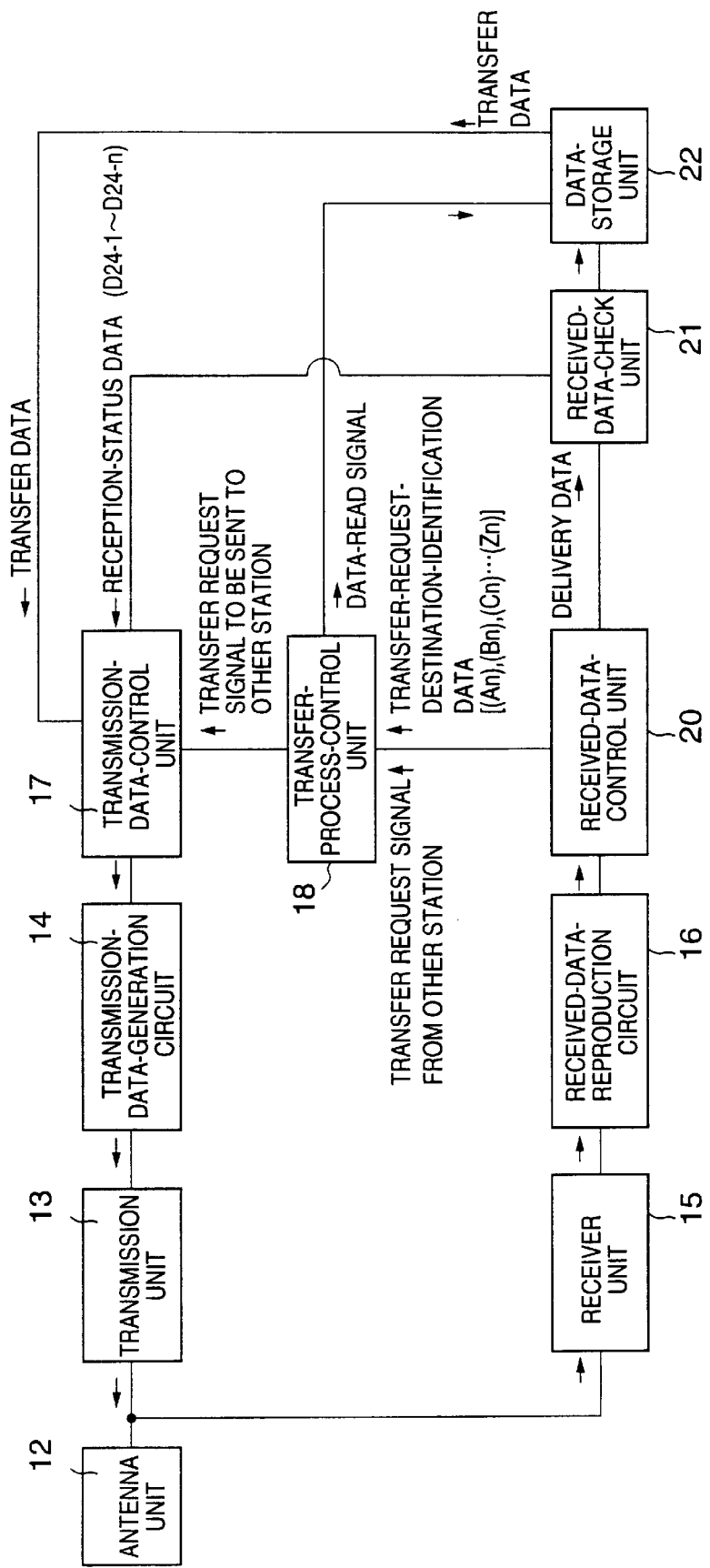
FIG. 10 is a block diagram showing a functional configuration of an earth receiver station according to the third embodiment of the present invention.

FIG. 10 is a block diagram showing a functional configuration of the earth receiver station according to the third embodiment of the present invention. The earth receiver station of FIG. 10 differs from the earth receiver station of FIG. 4 in that the request-signal-control unit 19 of FIG. 4 is removed in FIG. 10.

In what follows, operations of the earth receiver station according to the third embodiment will be described with reference to FIG. 10.

In the third embodiment, the earth receiver station is informed of an identification of a transfer-request destination that is selected by the earth transmission station 24-0, so that there is no need for the earth receiver station to go all the trouble of finding an appropriate transfer-request destination. In detail, the receiver unit 15 receives signals from the earth transmission station via the antenna unit 12, and the received-data-reproduction circuit 16 obtains the transfer-request-destination-identification data (An), (Bn), (Cn), . . . , and (Zn) from the received signals. The transfer-request-destination-identification data (An), (Bn), (Cn), . . . , and (Zn) is then supplied to the transfer-process-control unit 18.

Basically, the third embodiment follows the same operation steps as the first embodiment up to this point. Thereafter, the transfer-process-control unit 18 generates a transfer-request signal based on the transfer-request-destination-identification data (An), (Bn), (Cn), . . . , and (Zn), and supplies it to the transmission-data-control unit 17. The transmission-data-control unit 17 transmits the transfer-request signal via the transmission-data-generation circuit 14, the transmission unit 13, and the antenna unit 12.

Figure 11:
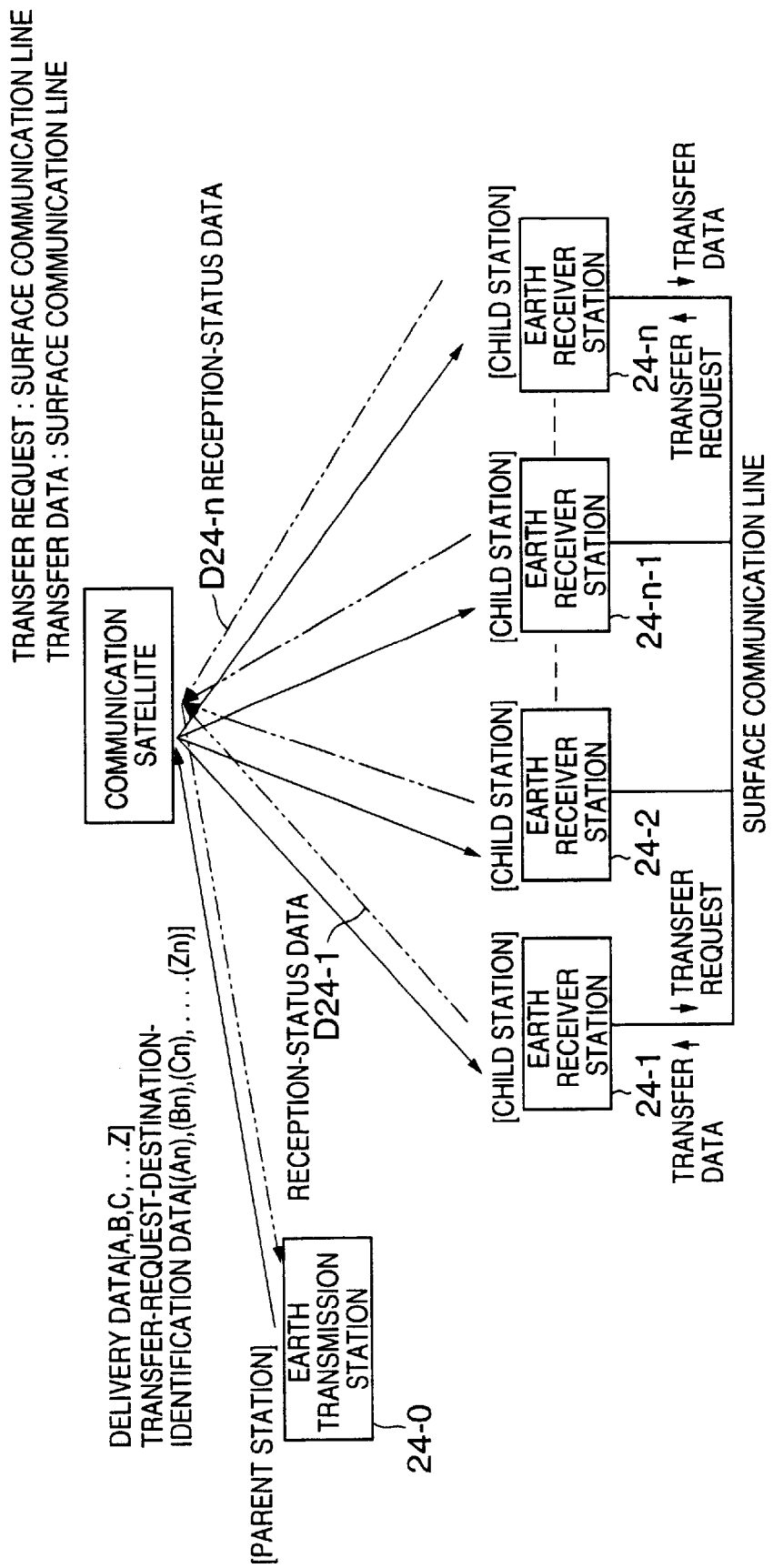
FIG. 11 is an illustrative drawing showing a configuration of a satellite communication system according to a fourth embodiment of the present invention.

FIG. 11 is an illustrative drawing showing a configuration of a satellite communication system according to a fourth embodiment of the present invention, in which data delivered via satellite links is resent from an earth receiver station to another earth receiver station via a surface communication line under the control of the earth transmission station. In the system configuration of the fourth embodiment, the earth receiver stations 24-1–24-n are connected together via a surface communication line.

Operations of the fourth-embodiment configuration will be described below with reference to FIG. 11.

In a method of data transfer according to the fourth embodiment, an earth receiver station that has successfully received correct delivery data sends the delivery data via a surface communication line to another earth receiver station that has failed to receive the correct delivery data. Use of the surface communication line is the only difference between the fourth embodiment and the third embodiment.

Operations of the fourth embodiment are identical to those of the third embodiment up to a point where an earth receiver station failing to receive correct delivery data generates a transfer request based on the transfer-request-destination-identification data (An), (Bn), (Cn), . . . , and (Zn). Thereafter, the earth receiver station sends the transfer request to an identified earth receiver station via a surface communication line. In response to the transfer request, the identified earth receiver station transfers requested data through the surface communication line to the station which requested the transfer of data. The station receiving the transferred data corrects the failed delivery data with the transferred data.

Figure 12:
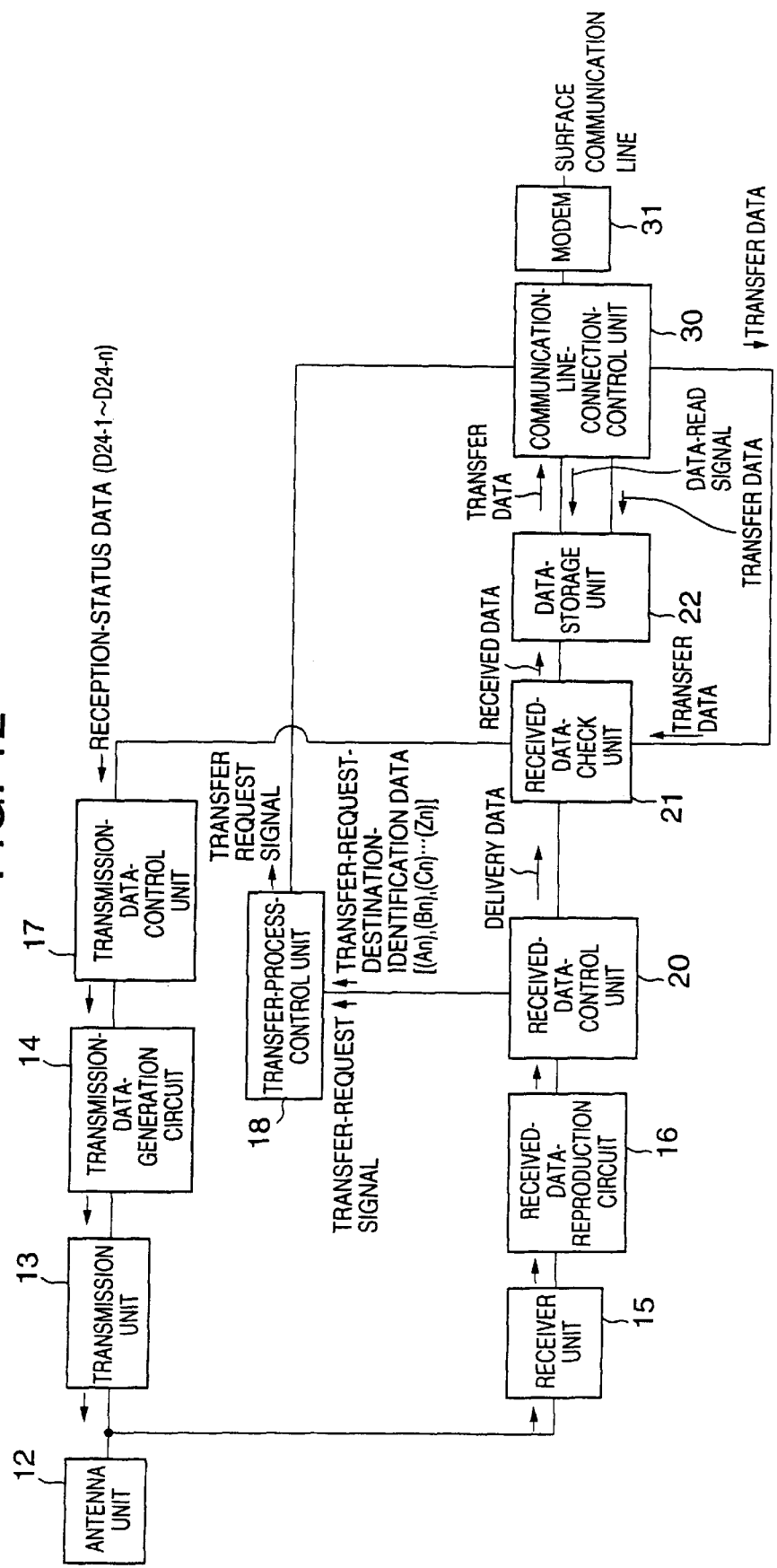
FIG. 12 is a block diagram showing a functional configuration of an earth receiver station according to the fourth embodiment of the present invention.
Figure 13:
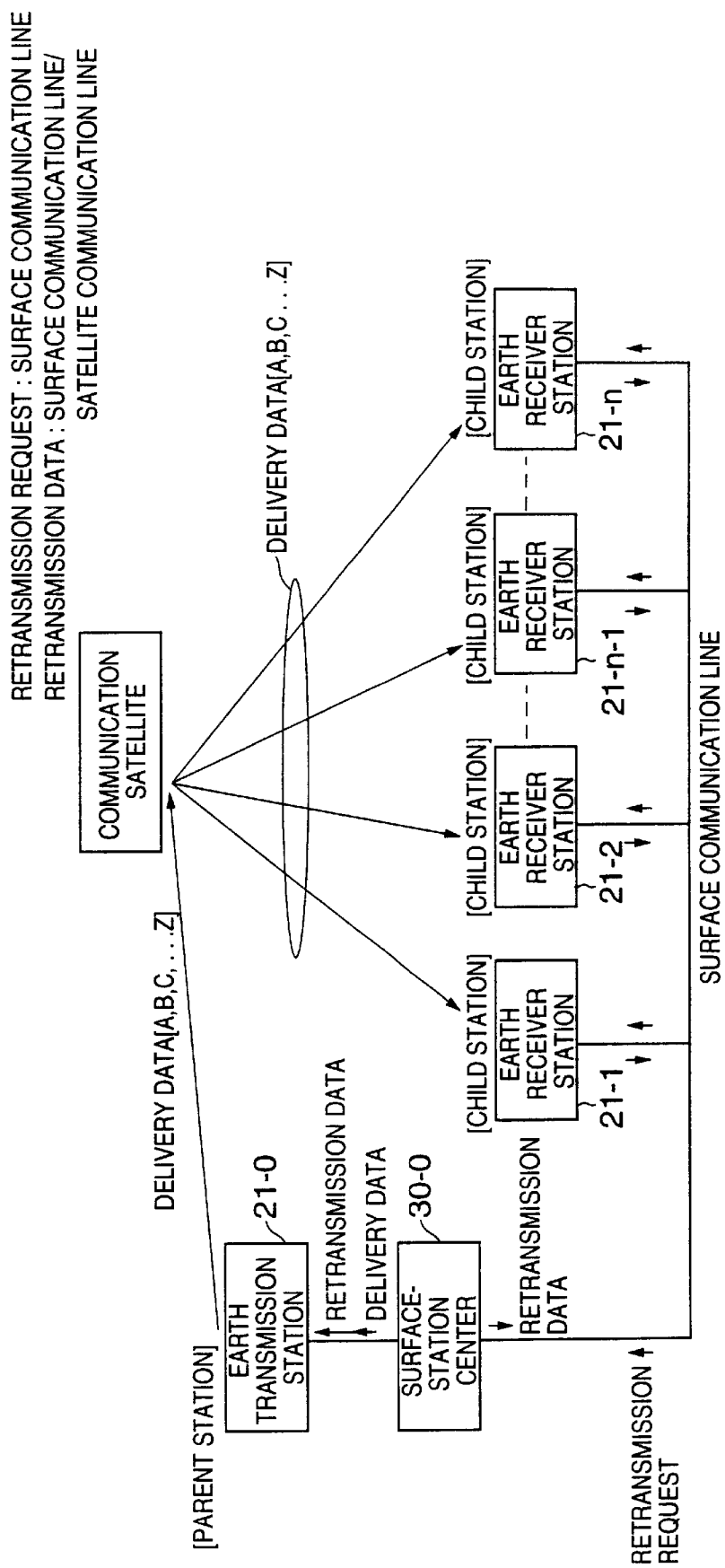
FIG. 13 is an illustrative drawing showing a configuration of a related-art satellite communication system.
Figure 14:
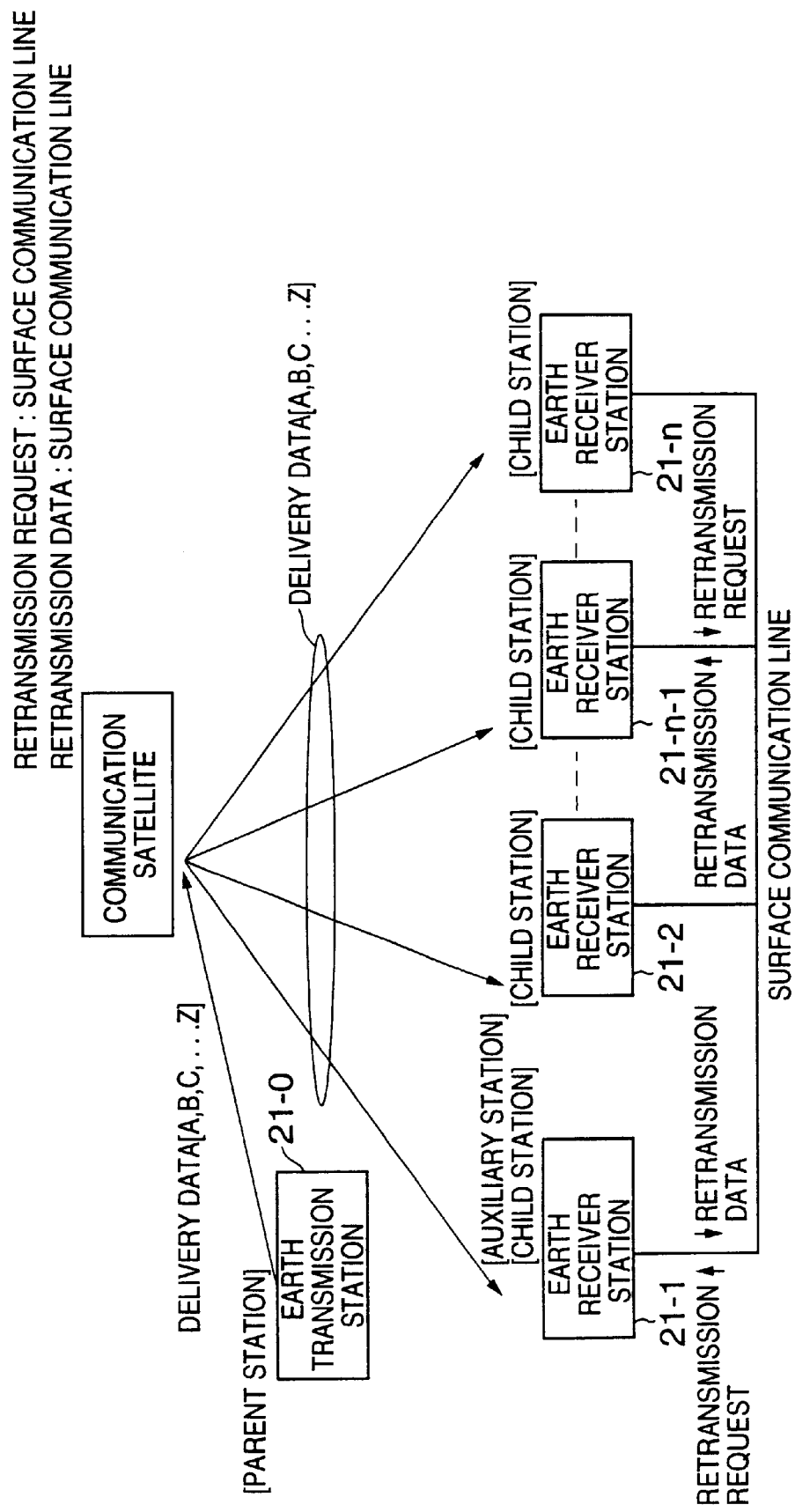
FIG. 14 is an illustrative drawing showing another configuration of a related-art satellite communication system.

FIG. 12 is a block diagram showing a functional configuration of the earth receiver station according to the fourth embodiment of the present invention.

The earth receiver station of FIG. 12 includes the communication-line-connection-control unit 30 and the modem 31 identical to those of FIG. 6 in addition to the configuration of the third embodiment shown in FIG. 10.

Operations of the earth receiver station according to the fourth embodiment are simply a combination of those of the third embodiment and the second embodiment, and a description thereof will be omitted.

In the embodiments described above, various modifications may be made.

The third embodiment was described with reference to a case where an earth receiver station failing to receive correct data is informed of a transfer-request destination. The present invention is not limited to this configuration, but is applicable to a configuration where an earth receiver station that has successfully received correct data is informed of an identification of another earth receiver station as a destination of data transfer so that the missing data is transferred from the former earth receiver station to the latter earth receiver station. In this configuration, the earth receiver station that has successfully received correct data transfers data to another earth receiver station that has failed to receive the correct data, and does not need to receive a transfer request from the latter earth receiver station to initiate the transfer of data. In other words, the earth receiver station that has failed to receive correct data does not need to send a transfer request to the earth receiver station that has succeeded in receiving correct data. This configuration saves time and labor associated with a generation and transmission of a transfer request.

Further, the present invention is not limited to these embodiments, but various variations and modifications may be made without departing from the scope of the present invention.

The present application is based on japanese priority application no. 10-275898 filed on Sep. 29, 1998, with the japanese patent office, the entire contents of which are hereby incorporated by reference.

What is claimed is:

1. A method of delivering data from a transmission station to receiver stations via satellite communication links, comprising the steps of:

a) delivering delivery data from the transmission station to the receiver stations via the satellite communication links;

b) checking if the delivery data is successfully received at each of the receiver stations;

c) sending results of the check from the receiver stations to the transmission station;

d) generating control data from the results of the check at the transmission station, the control data indicating which receiver station failed to receive the delivery data and which receiver station succeeded in receiving the delivery data;

e) sending the control data from the transmission station to the receiver stations; and f) transferring the delivery data in response to the control data from a first one of the receiver stations having succeeded in receiving the delivery data to a second one of the receiver stations having failed to receive the delivery data.

2. The method as claimed in claim 1, wherein said step d) generates the control data by lumping together the results of the check.

3. The method as claimed in claim 1, wherein said step f) comprises the steps of:

selecting, at the second one of the receiver stations, the first one of the receiver stations based on the control data;

sending a transfer request from the second one of the receiver stations to the first one of the receiver stations; and transferring the delivery data from the first one of the receiver stations to the second one of the receiver stations in response to the transfer request.

4. The method as claimed in claim 1, wherein said step d) further comprising a step of including a transfer instruction in the control data, the transfer instruction indicating that the delivery data should be transferred from the first one of the receiver stations to the second one of the receiver stations.

5. The method as claimed in claim 4, wherein said step f) comprises the steps of:

sending a transfer request from the second one of the receiver stations to the first one of the receiver stations according to the transfer instruction; and transferring the delivery data from the first one of the receiver stations to the second one of the receiver stations in response to the transfer request.

6. The method as claimed in claim 4, wherein said step f) comprises a step of transferring the delivery data from the first one of the receiver stations to the second one of the receiver stations in response to the transfer instruction.

7. The method as claimed in claim 1, wherein said step e) sends the control data from the transmission station to the receiver stations via the satellite communication links.

8. The method as claimed in claim 1, wherein said step f) transfers the delivery data from the first one of the receiver stations to the second one of the receiver stations via a satellite communication link.

9. The method as claimed in claim 1, wherein said step f) transfers the delivery data from the first one of the receiver stations to the second one of the receiver stations via a surface communication line.

10. A device for delivering data to receiver stations via satellite communication links, comprising:

a transmission unit which transmits delivery data to the receiver stations via the satellite communication links;

a receiver unit which receives check results from the respective receiver stations, the check results indicating whether the respective receiver stations have successfully received the delivery data; and a processing unit which generates control data from the check results, the control data being not the delivery data and indicating which receiver station failed to receive the delivery data and which receiver station succeeded in receiving the delivery data, wherein the control data is sent to the receiver stations to control transfer of the delivery data between the receiver stations.

11. The device as claimed in claim 10, wherein said processing unit generates the control data by lumping together the check results.

12. The device as claimed in claim 10, wherein said processing unit further includes a transfer instruction in the control data, the transfer instruction indicating that the delivery data should be transferred from a first one of the receiver stations having succeeded in receiving the delivery data to a second one of the receiver stations having failed to receive the delivery data.

13. The device as claimed in claim 10, wherein the control data is sent to the receiver stations by said transmission unit via the satellite communication links.

14. A device for receiving data from a transmission station in a system in which the transmission station delivers the data to a plurality of receiver devices inclusive of said device via satellite communication links, said device comprising:

a check unit which checks if delivery data is successfully received from the transmission station;

a storage unit which stores the delivery data if the delivery data is successfully received;

a transmission unit which transmits a result of the check to the transmission station;

a transfer control unit which arranges a transfer of the delivery data between said device and one of the receiver devices in response to control data sent from the transmission station so as to recover the delivery data that was not successfully delivered, the control data indicating which receiver device failed to receive the delivery data and which receiver device succeeded in receiving the delivery data.

15. The device as claimed in claim 14, wherein said transfer control unit selects one of the receiver devices based on the control data so as to send a transfer request to the selected one of the receiver devices, and transfers the delivery data from the storage unit to one of the receiver devices if a transfer request is sent therefrom.

16. The device as claimed in claim 14, wherein the control data includes a transfer instruction indicating that the delivery data should be transferred from a first one of the receiver devices to a second one of the receiver devices, and wherein said transfer control unit sends a transfer request to the first one of the receiver devices if said device is the second one of the receiver devices, and transfers the delivery data from the storage unit to one of the receiver devices if a transfer request is sent therefrom.

17. The device as claimed in claim 14, wherein the control data includes a transfer instruction indicating that the delivery data should be transferred from a first one of the receiver devices to a second one of the receiver devices, and said transfer control unit transfers the delivery data from the storage unit to the second one of the transfer devices in response to the control data if said device is the first one of the receiver devices.

18. The device as claimed in claim 14, wherein the transfer of the delivery data is carried out via a satellite communication link.

19. The device as claimed in claim 14, wherein the transfer of the delivery data is carried out via a surface communication line.

* * * * *